United States Patent
Kob et al.

(10) Patent No.: US 12,437,114 B2
(45) Date of Patent: Oct. 7, 2025

(54) METHOD AND SYSTEM FOR GRANTING ACCESS RIGHTS TO CONTROL APPLICATIONS OF AN INDUSTRIAL AUTOMATION SYSTEM

(71) Applicant: Siemens Aktiengesellschaft, Munich (DE)

(72) Inventors: Peter Kob, Heroldsberg (DE); Maximilian Hoch, Adelsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/849,595

(22) PCT Filed: Feb. 27, 2023

(86) PCT No.: PCT/EP2023/054785
§ 371 (c)(1),
(2) Date: Sep. 23, 2024

(87) PCT Pub. No.: WO2023/180009
PCT Pub. Date: Sep. 28, 2023

(65) Prior Publication Data
US 2025/0165653 A1    May 22, 2025

(30) Foreign Application Priority Data
Mar. 25, 2022   (EP) .................................. 22164332

(51) Int. Cl.
*G06F 9/455* (2018.01)
*G06F 9/54* (2006.01)
(Continued)

(52) U.S. Cl.
CPC ........ *G06F 21/629* (2013.01); *G06F 9/45558* (2013.01); *G06F 2009/45562* (2013.01); *G06F 2009/4557* (2013.01)

(58) Field of Classification Search
CPC ............... G06F 21/629; G06F 9/45558; G06F 2009/45562; G06F 2009/4557
(Continued)

(56) References Cited

U.S. PATENT DOCUMENTS

| 10,922,090 B1 | 2/2021 | Lieberman et al. |
| 2005/0240906 A1* | 10/2005 | Kinderknecht ....... G06F 9/4843 717/136 |

(Continued)

FOREIGN PATENT DOCUMENTS

| CN | 110383240 | 10/2019 |
| CN | 112241533 | 1/2021 |

(Continued)

OTHER PUBLICATIONS

PCT International Search Report dated Jun. 15, 2023 based on PCT/EP2023/054785 filed Feb. 27, 2023.

*Primary Examiner* — Emmanuel L Moise
*Assistant Examiner* — Berhanu Shitayewoldetadik
(74) *Attorney, Agent, or Firm* — Cozen O'Connor

(57) ABSTRACT

System and method for granting access rights to control applications of an industrial automation system, wherein first control applications are initially provided via software containers that are loaded into a container runtime environment installed on a host operating system, and executed there, the first control applications are monitored and configured via an application management system, additionally the first control applications are authenticated via the application management system, second control applications are executed and cryptographically authenticated directly on a host operating system, and data traffic from the first and second control applications to target devices and/or appli- (Continued)

cations are each authorized after successful authentication via an at least temporarily valid access key inserted into the data traffic.

12 Claims, 2 Drawing Sheets

(51) Int. Cl.
  *G06F 21/41* (2013.01)
  *G06F 21/53* (2013.01)
  *G06F 21/62* (2013.01)
  *H04L 9/32* (2006.01)
  *H04L 29/06* (2006.01)

(58) Field of Classification Search
  USPC .................................................... 726/4
  See application file for complete search history.

(56) References Cited

U.S. PATENT DOCUMENTS

| | | | |
|---|---|---|---|
| 2005/0283830 A1* | 12/2005 | Guthery | H04L 9/40 |
| | | | 726/4 |
| 2015/0281233 A1 | 10/2015 | Asenjo et al. | |
| 2016/0164673 A1* | 6/2016 | Grimault | H04L 9/0816 |
| | | | 380/44 |
| 2018/0268156 A1 | 9/2018 | Luo et al. | |
| 2018/0367528 A1 | 12/2018 | Schwarz et al. | |
| 2019/0182295 A1* | 6/2019 | Pulapaka | H04L 63/20 |
| 2021/0019416 A1 | 1/2021 | Höfele et al. | |
| 2025/0090964 A1* | 3/2025 | Grimm | A63F 13/35 |

FOREIGN PATENT DOCUMENTS

| | | | | |
|---|---|---|---|---|
| CN | 112988333 | | 6/2021 | |
| CN | 114598463 B | * | 10/2024 | ......... H04L 63/0823 |
| CN | 114154173 B | * | 12/2024 | ........... G06F 21/602 |
| EP | 4194973 | | 6/2023 | |
| WO | 2021104632 | | 6/2021 | |

* cited by examiner

METHOD AND SYSTEM FOR GRANTING ACCESS RIGHTS TO CONTROL APPLICATIONS OF AN INDUSTRIAL AUTOMATION SYSTEM

CROSS-REFERENCE TO RELATED APPLICATIONS

This is a U.S. national stage of application No. PCT/EP2023/054785 filed 27 Feb. 2023. Priority is claimed on European Application No. 22164332.3 filed 25 Mar. 2022, the content of which is incorporated herein by reference in its entirety.

BACKGROUND OF THE INVENTION

1. Field of the Invention

The present invention relates to a system and method for granting access rights to control applications of an industrial automation system.

2. Description of the Related Art

Industrial automation systems normally comprise a multiplicity of automation devices that are networked with one another via an industrial communication network and, in a production or process automation context, serve to control or regulate plants, machines or devices. Due to time-critical boundary conditions in industrial automation systems, real-time communication protocols, such as PROFINET, PROFIBUS, real-time Ethernet or time-sensitive networking (TSN), are predominantly used for communication between automation devices. In particular, control services or control applications can be automated and can be distributed depending on utilization among currently available hosts or virtual machines of an industrial automation system.

WO 2021/104632 A1 relates to a method for capturing packets originating from a first container within a cluster of containers. A plurality of network interfaces for transmitting packets are assigned to each container. As soon as a first connection for transmitting data packets via a first network interface that is assigned to a first container is detected, an identifier assigned to the first container is inserted into a first data stream assigned to the first connection. The first container can be identified based on the inserted identifier for capturing data packets originating from it.

In older European patent application with application file reference 21212849.0, a method providing for control applications is described in which the control applications are each provided via process control components that are loadable into and executable in a process control environment formed via a server device. An identification as a security-critical control application is assigned to each of the control applications that require selected security authorizations. At least one process condition for the selected security authorizations is defined case for each of the control applications to which an identification as a security-critical control application is assigned. During an execution of the process control components for each of the control applications, the process control environment monitors an occurrence of the respective process condition. The each execution of the process control components is terminated when the respective process condition occurs.

U.S. Pub. No. 2019/182295 A1 discloses a method for granting access rights to control applications in which the control applications are provided via software containers that are loaded into and executed in a container runtime environment installed on a host operating system. The control applications are monitored and configured via an application management system. Following successful authentication by a web proxy, data traffic from the control applications to target devices or target applications is authorized in each case via an access key inserted into the data traffic.

Industrial automation systems comprise numerous control applications that must authenticate themselves to other systems or system components. In existing, in particular older, control applications or in control applications from third-party providers, the problem often arises that these control applications do not support authentication methods required each of the target systems. As a result, control applications must normally undergo complex adaptation according to the required authentication methods, or an authentication is even deactivated. Even token-based methods do not provide a solution here, because a component accessing a target system is not generally identified with such methods.

SUMMARY OF THE INVENTION

In view of the foregoing, it is an object of the present invention to provide a device and method for granting access rights to control applications of an industrial automation system, where the device and method enable access to any target devices or target applications in industrial automation systems independently from an authentication method supported by the respective control application.

This and other objects and advantages are achieved in accordance with the invention by a system and method for granting access rights to control applications of an industrial automation system, where first control applications are provided via software containers that are loaded into and executed in a container runtime environment installed i on a host operating system. The first control applications are monitored and configured via an application management system. Moreover, the first control applications are authenticated via the application management system. Second control applications are executed and cryptographically authenticated directly on a host operating system. In particular, the first and the second control applications each have or perform no authentication functions.

In accordance with the invention, the software containers for the first control applications are each migratable from one automation device having a container runtime environment to another automation device having a container runtime environment for execution there, or are executable simultaneously on a plurality of automation devices having a container runtime environment. In addition, the application management system detects the creation, deletion or modification of the software containers and registers the software containers with their respective execution status. The creation, deletion or modification of the software containers each comprises allocating or releasing resources in the respective automation device having a container runtime environment. In this way, the first control applications can be orchestrated consistently by the application management system and can be authorized with regard to their data traffic.

Data traffic from the first and the second control applications to target devices or target applications is authorized in accordance with the invention following successful authentication in each case via an at least temporarily valid access key inserted into the data traffic. The access keys are each advantageously inserted into the respective data traffic by an assigned injector component separated from the first and the second control applications. The first and the second control applications are authenticated to the respective assigned injector component. In addition, the data traffic is preferably authorized only for trusted first and second control applications that are provided via a trusted path or by a trusted instance.

In contrast to conventional approaches in which communication connections are primarily secured cryptographically and can essentially be used by any applications, trusted control applications are identified with the present invention in order to authorize access to critical resources on this basis. In particular, it is not necessary for the control applications themselves to comprise or provide authentication functions.

The second control applications are advantageously cryptographically authenticated via digital signatures, computing process identifiers or by the operating system itself. For authentication during commissioning processes of automation devices upon which the second control applications are installed, root keys can be transferred onto the respective automation device. A root key of this type is required on each respective automation device for a successful authentication of a second control application. The root keys can each be exchanged, for example, continuously during the operation of the automation devices so that stringent security requirements can also be met with the present invention.

In accordance with a further embodiment of the present invention, the first and the second control applications are installed on automation devices that comprise a secured subnetwork that is assigned to the industrial automation system. Here, access is granted to the first and the second control applications from outside the secured subnetwork only following authorization by the application management system. A secure interaction of the first and the second control applications in particular with cloud computing systems is thereby ensured.

In addition, it can advantageously be provided that the first and the second control applications are authenticated to an injector component assigned to the application management system for accessing a cloud computing system outside the secured subnetwork. Following successful authentication, the injector component assigned to the application management system in each case inserts at least temporarily valid access keys into data traffic from the first and the second control applications to the cloud computing system. Access by the first and the second control applications to the cloud computing system is then authorized securely and efficiently via these access keys.

The system in accordance with the invention implements the method in accordance with disclosed embodiments and comprises a plurality of automation devices that are configured to provide first control applications via software containers that are loadable into and executable in a container runtime environment installed on a host operating system. Moreover, selected automation devices are configured to execute and cryptographically authenticate second control applications directly on a host operating system.

In addition, the system in accordance with the invention comprises an application management system that is configured to monitor, configure and authenticate the first control applications. The system is further configured to authorize data traffic from the first and the second control applications to each of the target devices or target applications following successful authentication via an at least temporarily valid access key inserted into the data traffic.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in detail below on the basis of an exemplary embodiment with reference to the drawing, in which.

DETAILED DESCRIPTION OF THE EXEMPLARY EMBODIMENTS

Figure 1:
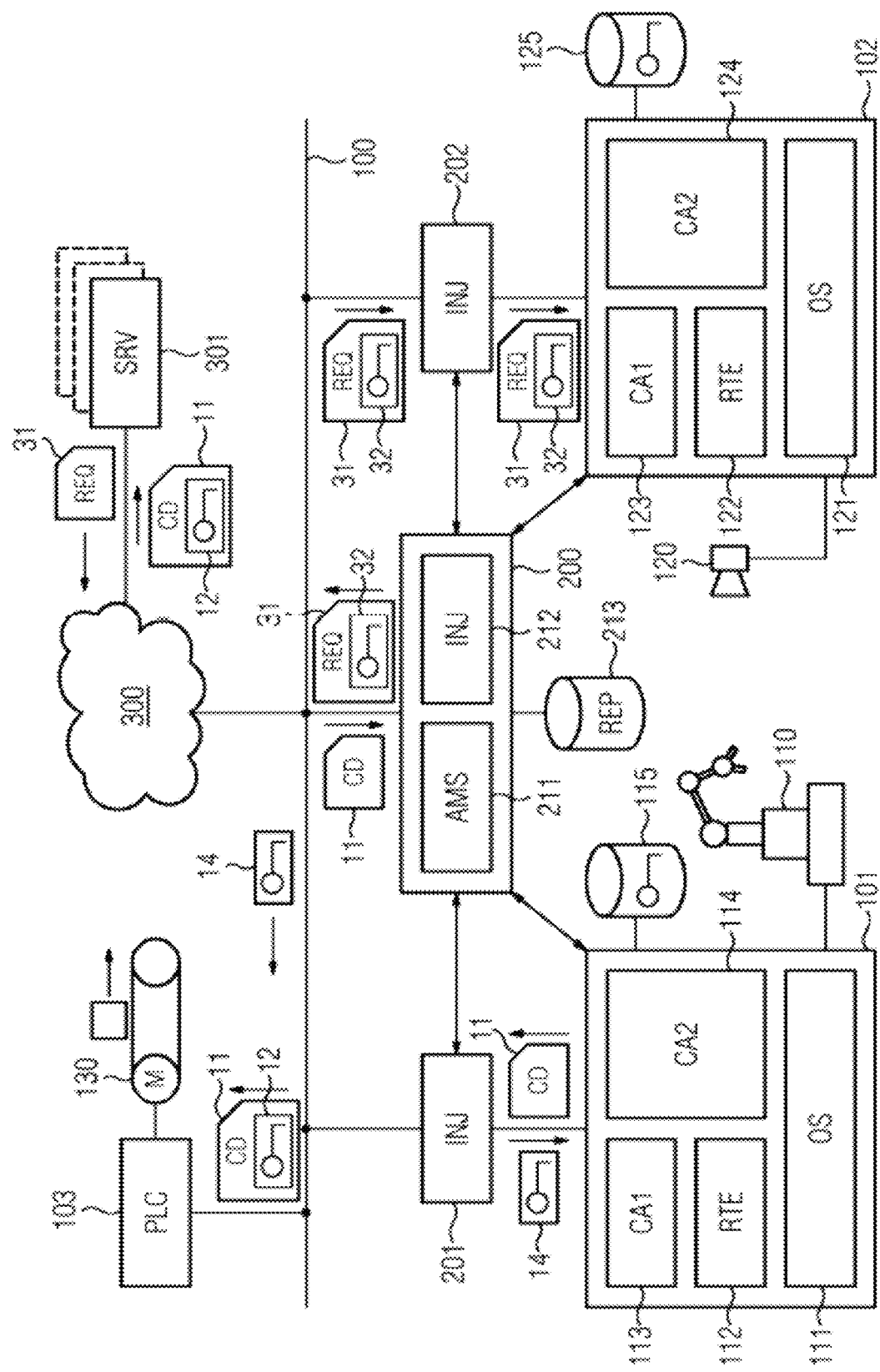
FIG. 1 shows a system having a plurality of automation devices, an application management system and a cloud computing system.

The system shown in FIG. 1 comprises a plurality of automation devices 101, 102, 103, an application management system 200 and a cloud computing system 301. The automation devices 101, 102, 103 and the application management system 200 comprise a secured subnetwork 100 that is assigned to an industrial automation system. The secured subnetwork 100 is connected to the cloud computing system 301 via a wide area network 300 which provides, in particular, Internet communication connections. A firewall system that can, for example, be integrated into the application management system 200 is preferably provided for the secured subnetwork 100. The cloud computing system 301 comprises at least one server via which IT infrastructure, such as storage space, computing power or application software, is provided as a service, in particular for the automation devices 101, 102, 103 or for the application management system 200.

The automation devices 101, 102, 103 can, for example, be operating and monitoring stations, programmable logic controllers, RFID readers or machine image processing systems. Along with the automation devices 101, 102, 103, the secured subnetwork 100 can also comprise network infrastructure devices, such as switches or routers. Network infrastructure devices serve, in particular, to connect programmable logic controllers, input/output units (I/O modules) or operating and monitoring stations of the industrial automation system.

Programmable logic controllers each comprise, for example, a communication module, a central unit and at least one input/output unit. Input/output units serve to exchange control and measurement variables between programmable logic controllers and machines or devices 110, 120, 130 controlled by the programmable logic controllers. The central units are provided, in particular, for determining suitable control variables from captured measurement variables. Input/output units can essentially also be formed as local peripheral modules that are disposed remotely from a programmable logic controller.

The automation devices 101, 102, 103 are configured to provide first control applications 113, 123 via software containers that are loadable into and executable in a container runtime environment 112, 122 installed on a host operating system 111, 121. The first control applications 113, 123 can implement, in particular, functions of automation devices, such as control and monitoring functions, or other time-critical services.

In the present exemplary embodiment, the first control applications 113, 123 are monitored and configured via the application management system 200. The application management system 200 detects the creation, deletion or modification of the software containers and registers the software containers with their respective execution status. The creation, deletion or modification of the software containers in each case comprises, in particular, an allocation or release of resources in the respective automation device 101, 102 having the container runtime environment 112, 122.

The application management system 200 further comprises an image repository 213 to provide stored images for the software containers. Alternatively or additionally, the stored images for the software containers can be retrieved from a storage and provisioning system, such as a docker hub or other container registry, to which a multiplicity of users have read or write access.

In particular, the software containers for the first control applications 113, 123 can each be migrated from an automation device 101, 102 having the container runtime environment 112, 122 onto a different automation device 102, 101 having the container environment 122, 112 for execution there, or can be executed simultaneously on a plurality of automation devices 101, 102, 103 having the container runtime environment 112, 122. Software containers are preferably each configured to execute in isolation from other software containers or container groups, e.g., pods, within the container runtime environment on the respective host operating system 111, 121. The software containers advantageously each use a kernel of the host operating system 111, 121 together with other software containers running or executing on the respective automation device. Other micro-virtualization concepts, such as snaps, can essentially also be used as an alternative to docker containers for the software containers.

In the present exemplary embodiment, the container runtime environment is a container engine via which virtual resources are created, deleted or linked. Along with software containers, the virtual resources also comprise virtual communication networks and connections assigned thereto. In particular, the container runtime environment can comprise a docker engine or a snap core which runs on the respective automation device 101, 102.

The automation devices 101, 102 are further configured to execute and cryptographically authenticate second control applications 114, 124 directly on the respective host operating system 111, 121. Conversely, the first control applications 113, 123 are authenticated via the application management system 200. In particular, the first control applications 113, 123 and the second control applications 114, 124 each have or perform no authentication function.

The second control applications 114, 124 can be cryptographically authenticated, for example, via digital signatures, computing process identifiers or by the operating system itself. In the present exemplary embodiment, a root key is required in each case on the respective automation device 101, 102 for a successful authentication of a second control application 114, 124. The root keys 14 are preferably transferred onto the automation device 101, 102 and stored there in a key repository 115, 125 for authentication during a commissioning process of the respective automation device 101, 102 upon which at least a second control application 114, 124 is installed. The root keys 14 can be transferred, for example, by the application management system 200 onto the automation devices 101, 102. The root keys 14 are each advantageously exchanged continuously during the operation of the automation devices 101, 102.

Data traffic 11 from the first and the second control applications to target devices 103 or respective target applications is authorized in each case following successful authentication via an at least temporarily valid access key 12 inserted into the data traffic 11. The data traffic 11 is authorized only for trusted first control applications 113, 114 and second control applications 123, 124 that are provided via a trusted path or by a trusted instance, in particular by the application management system 200. The access keys 12 are each inserted into the respective data traffic 11 by an assigned injector component 201, 202 separated from the first control applications 113, 123 and the second control applications 114, 124. The first control applications 113, 123 and the second control applications 114, 124 are authenticated to the respective assigned injector component 201, 202.

In the present exemplary embodiment, the application management system 200 comprises an injector component 212 as well as an application management component 211. This injector component 212 ensures that the first control applications 113, 123 and the second control applications 114, 124 are accessed from outside the secured subnetwork 100 only following authorization by the application management system 200. To accomplish this, the application management system 200 inserts access keys 32, for example, in requests for access to the cloud computing system 301, where access to the first control applications 113, 123 and the second control applications 114, 124 is authorized by the access keys 32.

In particular, the first and the second control applications are authenticated to the injector component 212 of the application management system 200 for access to the cloud computing system 301 outside the secured subnetwork 100. Furthermore, following successful authentication the injector component 212 of the application management system 200 in each case inserts at least temporarily valid access keys 12 into data traffic 11 from the first and the second control applications to the cloud computing system 301. Access by the first and the second control applications to the cloud computing system 301 is authorized via these access keys 12.

Figure 2:
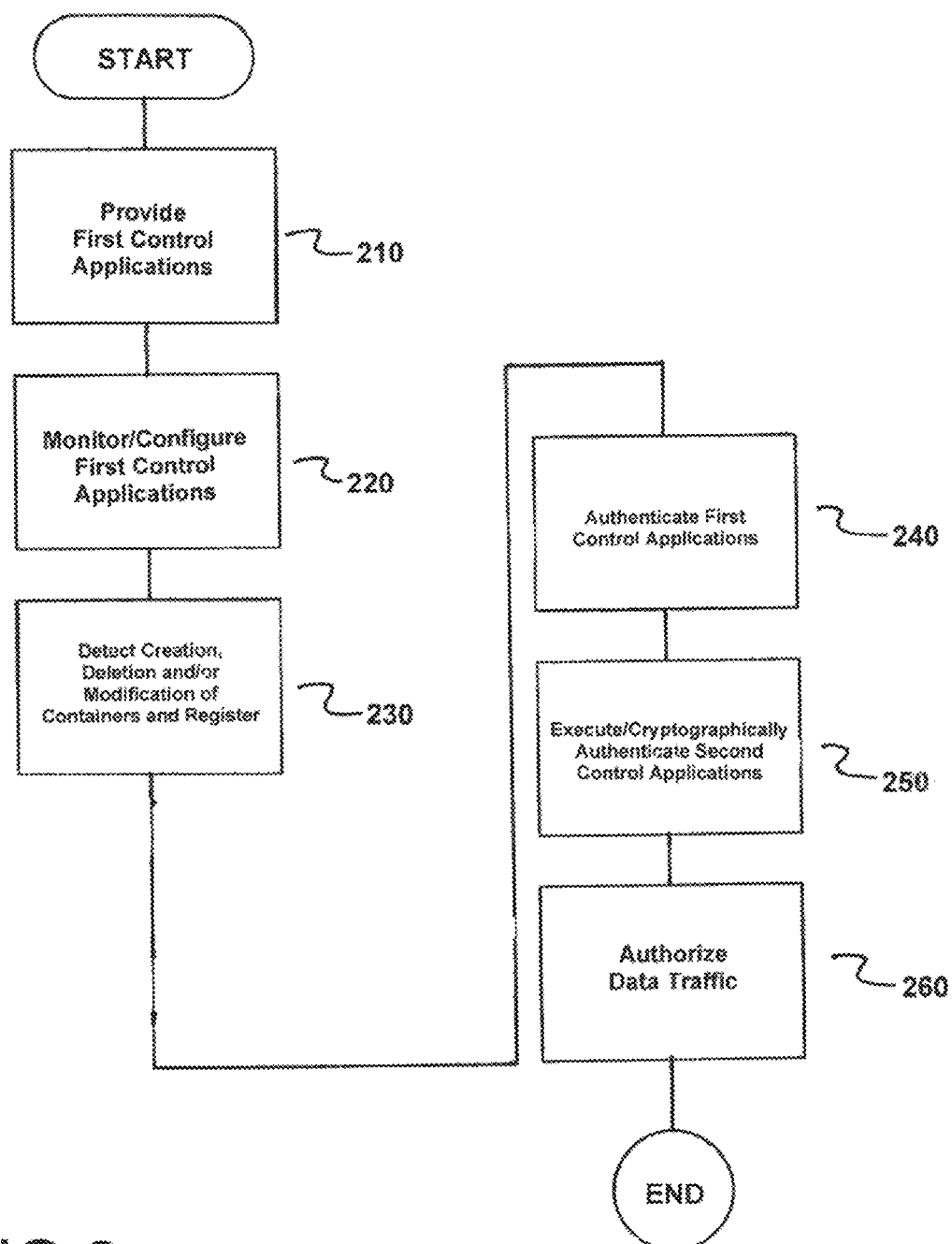
FIG. 2 is a flowchart of the method in accordance with the invention.

FIG. 2 is a flowchart of the method for granting access rights to control applications of an industrial automation system. The method comprises providing first control applications 113, 123 via software containers that are loaded into and executed in a container runtime environment 112, 122 installed on a host operating system 111, 121, as indicated in step 210. In accordance with the method, the software containers for the first control applications are each migratable from one automation device having a container runtime environment to another automation device having a container runtime environment for execution there and/or executable simultaneously on a plurality of automation devices having a container runtime environment.

Next, the first control applications are monitored and configured via an application management system 200, as indicated in step 220.

Next, the application management system, detects the creation, deletion and/or modification of the software containers, and registers the software containers with their respective execution status, as indicated in step 230. Here, the creation, deletion and/or modification of the software containers each comprises allocating or releasing resources in a respective automation device having a container runtime environment.

Next, the first control applications are authenticated via the application management system, as indicated in step 240.

Next, the second control applications 114, 124 are executed and cryptographically authenticated directly on a host operating system 111, 121, as indicated in step 250.

Next, data traffic 11 from the first and the second control applications to target devices 103, 301 and/or target applications are authorized following successful authentication in each case via an at least temporarily valid access key 12 inserted into the data traffic 11, as indicated in step 260.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of granting access rights to control applications of an industrial automation system, the method comprising:
   providing first control applications via software containers which are loaded into and executed in a container runtime environment installed on a host operating system, the software containers for the first control applications each being at least one of (i) migratable from one automation device having a container runtime environment to another automation device having a container runtime environment for execution there and (ii) executable simultaneously on a plurality of automation devices having a container runtime environment;
   monitoring and configuring the first control applications via an application management system;
   detecting, by the application management system, at least one of creation, deletion and modification of the software containers, and registering, by the application management system, the software containers with their respective execution status, at least one of the creation, deletion and modification of the software containers each comprising allocating or releasing resources in a respective automation device having a container runtime environment;
   authenticating the first control applications via the application management system;
   executing and cryptographically authenticating second control applications directly on a host operating system; and
   authorizing data traffic from at least one of (i) the first and the second control applications to target devices and (ii) target applications following successful authentication in each case via an at least temporarily valid access key inserted into the data traffic;
   wherein the first and second control applications are installed on automation devices which comprise a secured subnetwork which is assigned to the industrial automation system; and
   wherein the first and the second control applications are accessed from outside the secured subnetwork only following authorization by the application management system.

2. The method as claimed in claim 1, wherein the data traffic is authorized only for trusted first control applications and second control applications which are provided at least one of via a trusted path and by a trusted instance.

3. The method as claimed in claim 2, wherein access keys are each inserted into the respective data traffic by an assigned injector component separated from the first control applications and the second control applications; and wherein the first and the second control applications are authenticated to the respective assigned injector component.

4. The method as claimed in claim 2, wherein the second control applications are cryptographically authenticated via at least one of digital signatures, computing process identifiers and the operating system itself.

5. The method as claimed in claim 1, wherein access keys are each inserted into the respective data traffic by an assigned injector component separated from the first control applications and the second control applications; and wherein the first and the second control applications are authenticated to the respective assigned injector component.

6. The method as claimed in claim 5, wherein the second control applications are cryptographically authenticated via at least one of digital signatures, computing process identifiers and the operating system itself.

7. The method as claimed in claim 1, wherein the second control applications are cryptographically authenticated via at least one of digital signatures, computing process identifiers and the operating system itself.

8. The method as claimed in claim 7, wherein root keys are transferred onto the respective automation device for authentication during commissioning processes of automation devices upon which the second control applications are installed; and wherein a root key is required on each respective automation device for a successful authentication of a second control application.

9. The method as claimed in claim 8, wherein the root keys are each continuously exchanged during operation of the automation devices.

10. The method as claimed in claim 1, wherein the first and the second control applications each have and/or perform no authentication functions.

11. The method as claimed in claim 1, wherein the first and second control applications are authenticated to an injector component assigned to the application management system for accessing a cloud computing system outside the secured subnetwork;
   wherein, following successful authentication, the injector component assigned to the application management system in each case inserts at least temporarily valid access keys into data traffic from the first and the second control applications to the cloud computing system; and
   wherein access by the first and the second control applications to the cloud computing system is subsequently authorized securely and efficiently via the at least temporarily valid access keys.

12. A system comprising:
a plurality of automation devices which are configured to provide first control applications via software containers which are loadable into and executable in a container runtime environment installed on a host operating system, selected automation devices being configured to execute and cryptographically authenticate second control applications directly on a host operating system;
an application management system which is configured to monitor, configure and authenticate the first control applications;
wherein the software containers for the first control applications are each at least one of (i) migratable from one automation device having a container runtime environment to another automation device having a container runtime environment for execution there and (ii) executable simultaneously on a plurality of automation devices having a container runtime environment;
wherein the application management system is configured to detect at least one of creation, deletion and modification of the software containers and to register the software containers with their respective execution status, at least one of the creation, deletion and modification of the software containers each comprising allocating or releasing resources in the respective automation device having a container runtime environment;
wherein the system is configured to authorize data traffic from the first and the second control applications to at least one of (i) target devices and (ii) target applications following successful authentication in each case via an at least temporarily valid access key inserted into the data traffic;
wherein the first and second control applications are installed on automation devices which comprise a secured subnetwork which is assigned to the industrial automation system; and
wherein the first and the second control applications are accessed from outside the secured subnetwork only following authorization by the application management system.

* * * * *